3,420,922
PRODUCTION OF HYDRAULIC BINDERS
Josef Wuhrer, Wulfrath, Germany, assignor to Rheinische Kalkstein-Werke G.m.b.H., Wulfrath, Germany
Filed July 13, 1967, Ser. No. 653,203
Claims priority, application Germany, July 14, 1966, R 43,692
U.S. Cl. 263—53      4 Claims
Int. Cl. C04b *1/02; 7/44;* F27b *1/08*

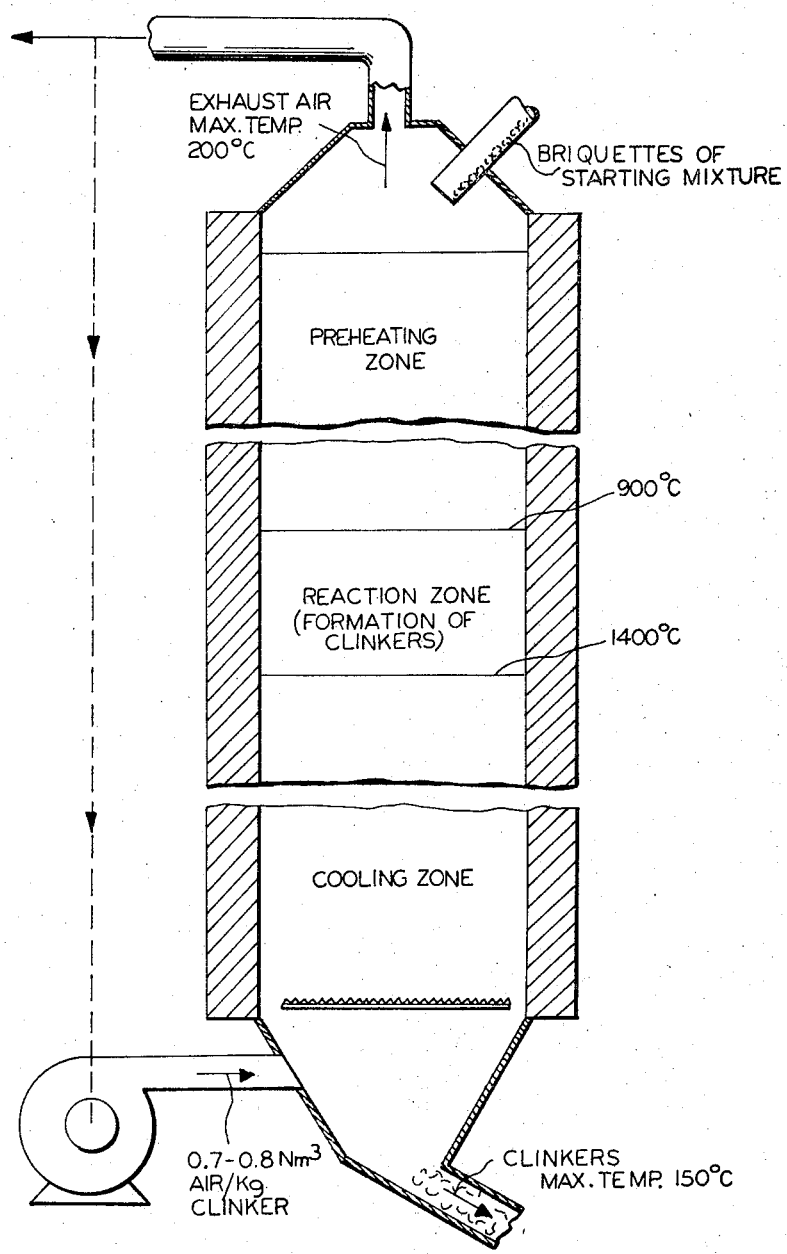

ABSTRACT OF THE DISCLOSURE

In the production of cement clinkers, the heat required for preheating the raw mix and bringing about the endothermic reactions therein is substantially completely furnished by the heat evolved in the exothermic clinker formation, by feeding raw mix briquettes of a powder leaving on a 4900 mesh screen a residue of less than 10% into a vertical kiln and passing in countercurrent thereto air in an amount of 0.68 to 0.82 Nm.$^3$ per kg. of discharged clinker.

---

The present invention relates to an improved method of preparing hydraulic binders like cement and the like from briquetted argillaceous and calcareous materials.

Methods are known where the required heat is produced by the combustion of fuel. Such fuel consumption is costly and may render the process uneconomic.

It is also known that the formation of clinkers from the oxides of calcium, silicon, aluminum, and iron is exothermic; when burnt lime is used as raw material the heat development starts at about 900–950° C. and is terminated, after sintering, at temperatures in the range of 1350 to 1400° C. Depending on the composition of the various oxides, the developed heat is about 90–110 Cal./kg. of clinker. As average, a value of about 100 Cal./kg. of clinker may be assumed.

I have now found that the consumption of fuel can be considerably reduced or entirely dispensed with when a raw meal which on a 4900 mesh screen (DIN 4188) leaves a residue of less than 10, preferably less than 8 percent, is briquetted, whereby, if desired, a small amount of binder may be added; such briquettes are then placed in a reactor in which they are brought to the clinker formation temperature by means of hot air which is preheated by the hot clinkers and passed in countercurrent over the clinker-forming briquetted material. Thereby, it is necessary to adjust the amount of air to 0.68–0.82, preferably 0.72 to 0.78 Nm.$^3$/kg. of discharged clinker.

For the briquetting, any conventional machine can be used whereby water or other conventional agents may be employed as binders. If a less fine powder is used, there remains an excessive amount of free lime in the finished clinkers.

The starting materials for the raw meal briquettes, particularly the clay, sand, or blast furnace slag should be dried before they are mixed with the burnt lime; otherwise, said burnt lime would react with the moisture of said additions to form calcium hydroxide and no longer be present in the briquette as burnt lime. Preferably, the raw meal or raw meal briquettes must contain clay, hydrated lime, or calcium carbonate only in such an amount as to require for their decomposition at most about 70 Cal. per kg. of clinker.

It may be further of advantage to dehydrate the clay before it is used.

Under the conditions recited hereinabove, the clinker formation starts at 900–950° C., and the sintering terminates at a temperature of about 1350–1400° C. Between said two temperature ranges, the heat development of 90–110° C. Cal./kg. of clinker takes place, and said heat is available to heat the material. Of course, care must be taken to retain the sensible heat of the clinker, which at 1400° C. is about 365 Cal. per kg. of clinker, in the system as completely as possible. For this purpose, it is important to provide for a good insulation of the reactor, which may be a shaft kiln and to restrict the radiation loss to at most 40 Cal. per kg. of clinker. This can be easily accomplished by well known means.

The sensible heat of the produced clinker is taken up by countercurrent air which transmits the heat to the briquettes and heats the same at least to reaction temperature. As stated above, 0.68 to 0.82, preferably 0.72 to 0.78 Nm.$^3$ of air must be applied per kg. of clinker. If the briquettes have a composition developing at the clinker formation 90 Cal./kg. of clinker, an amount of air close to the lower limit to the above recited range will be sufficient. On the other hand, an amount of air near the upper limit of the range will be applied when, due to the composition of the raw meal, the developed heat will be close to 110 Cal./kg. of clinker.

In all cases, the loss of heat evolved in the clinker formation, due to radiation and the heat content of the clinkers and air drawn from the kiln, must be kept so low as to leave sufficient heat available for the endothermic reactions preceding or accompanying the clinker formation (dehydration of $Ca(OH)_2$ and clay, decarbonation of limestone).

The method of the invention is preferably carried out in a shaft kiln as diagrammatically shown in the accompanying drawing which is given solely by way of illustration.

As shown in the drawing, the temperature of the exhaust air, i.e. of the air leaving the zone in which the briquettes are preheated, should not exceed 200° C. This corresponds to a heat loss of about 45 Cal./kg. of clinker for 0.8 Nm.$^3$ at a reference temperature of 20° C. Higher temperatures of the exhaust air would cause an excessive heat loss of the system: On the other hand, the temperature of the exhaust air must not drop below the dew point because then the water escaping from the hydrated lime or clay would condense in the upper part of the preheating zone and react with the quick lime to form calcium hydroxide whose decomposition would require additional heat.

According to the invention, a substantial amount of the sensible heat of the formed clinkers is transferred to the air passing over the clinkers in countercurrent. Therefore, the clinker when leaving the reactor must have a temperature not exceeding 150° C., which corresponds to about 25 Cal./kg. of clinker for a reference temperature of 20° C. Such a heat loss can be easily tolerated. Preferably, however, the temperature of the withdrawn clinkers should be below 130° C. Said temperature conditions are readily maintained by adjusting the amount of the countercurrent air; at high temperatures of the discharged clinkers, the amount of air will be increased, and it will be correspondingly decreased when the temperature of said clinkers shows an excessive drop.

Of course, it is also possible to control the temperature of the discharged clinkers at constant air quantities by the amount of the discharge, i.e. when the discharged clinkers have a high temperature, the discharge will be decreased, and it will be increased at low discharge temperatures.

The operation of my novel process is quite simple. A vertical kiln of the type used for the burning of limestone and dolomite can be employed. Such vertical shaft kilns must be carefully insuated. The briquettes are fed at the top of the oven. To start up the reactor, the briquettes in the reaction zone must first be heated by means of a suitable fuel to clinker forming temperature. Air is introduced from the bottom of the kiln, preferably by a blower, to cool the clinkers. Said air takes up the sensible heat of the clinkers and transfers it, after having passed the sintering zone, to the briquetted raw mix so as to heat the same to the clinker forming temperature. Therefore, the method requires fuel only to start up the kiln. When the recited optimum conditions are maintained, no further addition of fuel is required.

The economy of the process may be further improved by recycling the introduced air, which, at the same time, reduces the cost for the dust removal.

EXAMPLE

Briquettes were formed from finely ground and intimately mixed burned lime and dried clay slate with a small addition of finely ground sand in such proportions that a clinker of approximately the following composition was produced:

|  | Percent |
|---|---|
| CaO | 65 |
| $SiO_2$ | 21 |
| $Al_2O_3$ | 7 |
| $Fe_2O_3$ | 3 |

The mix contained 3.5 percent of calcium hydroxide, and 9 percent of calcium carbonate.

The briquettes were fired in an insulated shaft kiln of the type shown in the drawing. The rate of feed and discharge of the briquettes and the introduction of air were so adjusted that the clinkers drawn from the bottom of the kiln had a temperature of about 70° C. corresponding to a heat loss of 10 Cal./kg. clinker, and the exhaust air had a temperature of about 100° C., corresponding to a heat loss of about 20 Cal./kg. clinker. The heat loss through the walls of the kiln was about 10 Cal./kg. clinker.

The evolution of heat in the clinker formation zone was 100 Cal./kg. clinker. As the heat loss was 10+20+10 Cal./kg. clinker, 60 Cal./kg. clinker were available. This was just sufficient to provide the heat energy required, i.e. 21.0 Cal. for the dehydration of the clay, 7 Cal. for the dehydration of $Ca(OH)_2$, and 32 Cal. for the decarbonation of the calcium carbonate, per kg. of clinker.

I claim:

1. A method of preparing clinkers of a hydraulic binder comprising passing a briquetted cement forming mix shaped from a powder leaving less than 10 percent on a 4900 mesh screen (DIN 4188) and containing as major calcium compound burned lime, through a preheating zone, a sintering clinker forming zone and a cooling zone, discharging said clinkers at a temperature below 150° C. from the bottom of said cooling zone, passing in countercurrent to said clinkers through said zones air in an amount of 0.6 to 0.82 $Nm.^3$ per kg. of said discharged clinkers, and withdrawing the air from the top of said preheating zone at a temperature of less than 200° C. but above the dew point, thereby satisfying the heat requirements for preheating the briquettes and for the endothermic reactions taking place therein substantially by the heat evolved in the sintering zone and by the sensible heat of the formed clinkers.

2. The method as claimed in claim 1 wherein said mix contains clay, hydrated lime, and calcium carbonate in an amount requiring not more than 70 Cal. per kg. of discharged clinker.

3. The method as claimed in claim 1 wherein the amount of air is 0.72 to 0.78 $Nm.^3$ per kg. of discharged clinker.

4. The method as claimed in claim 1 comprising reusing at least partially said withdrawn air.

References Cited

UNITED STATES PATENTS

| 2,627,399 | 2/1953 | De Vaney | 263—53 X |
| 2,769,719 | 11/1956 | De Vaney | 213—53 X |

JOHN J. CAMBY, *Primary Examiner.*

U.S. Cl. X.R.

263—29